J. KELLY.
DEMOUNTABLE WHEEL.
APPLICATION FILED JAN. 2, 1914.
1,118,495.
Patented Nov. 24, 1914.
2 SHEETS—SHEET 1.
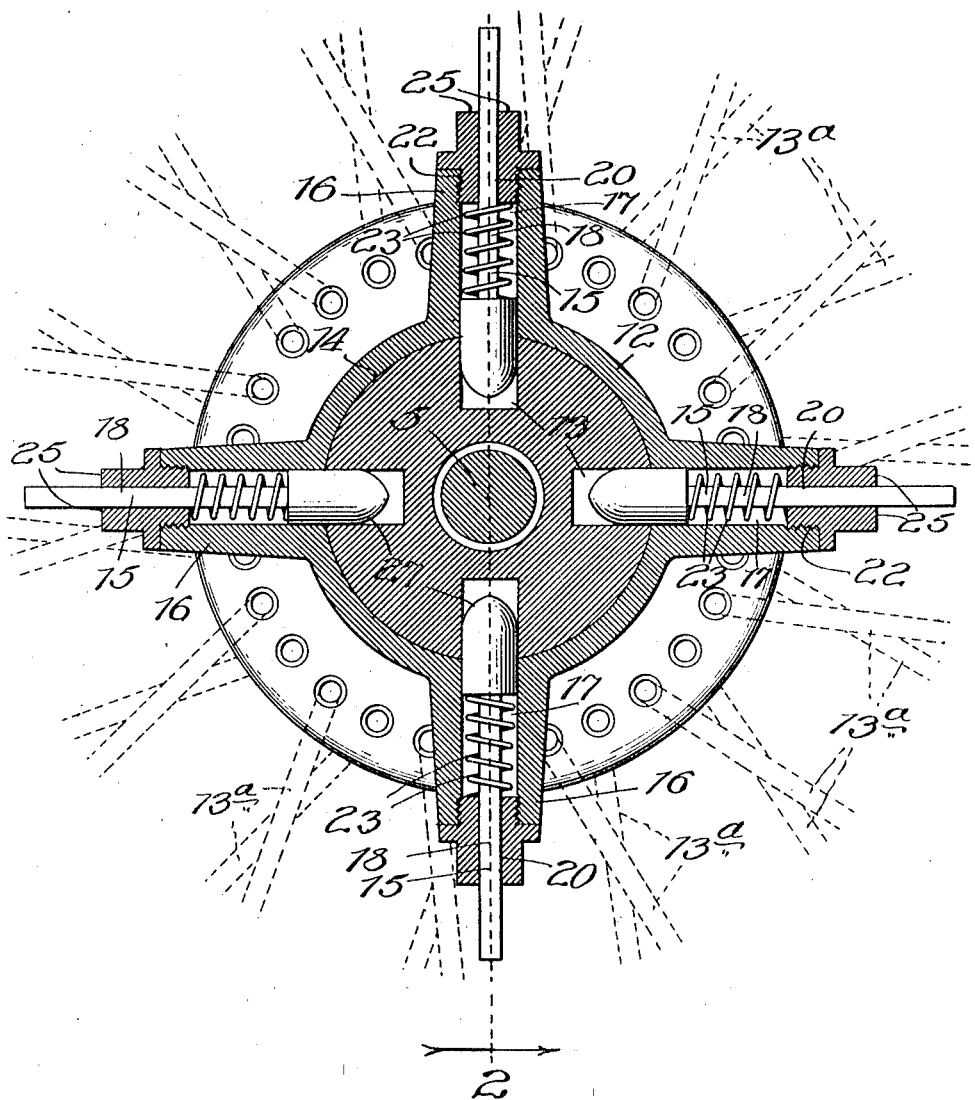

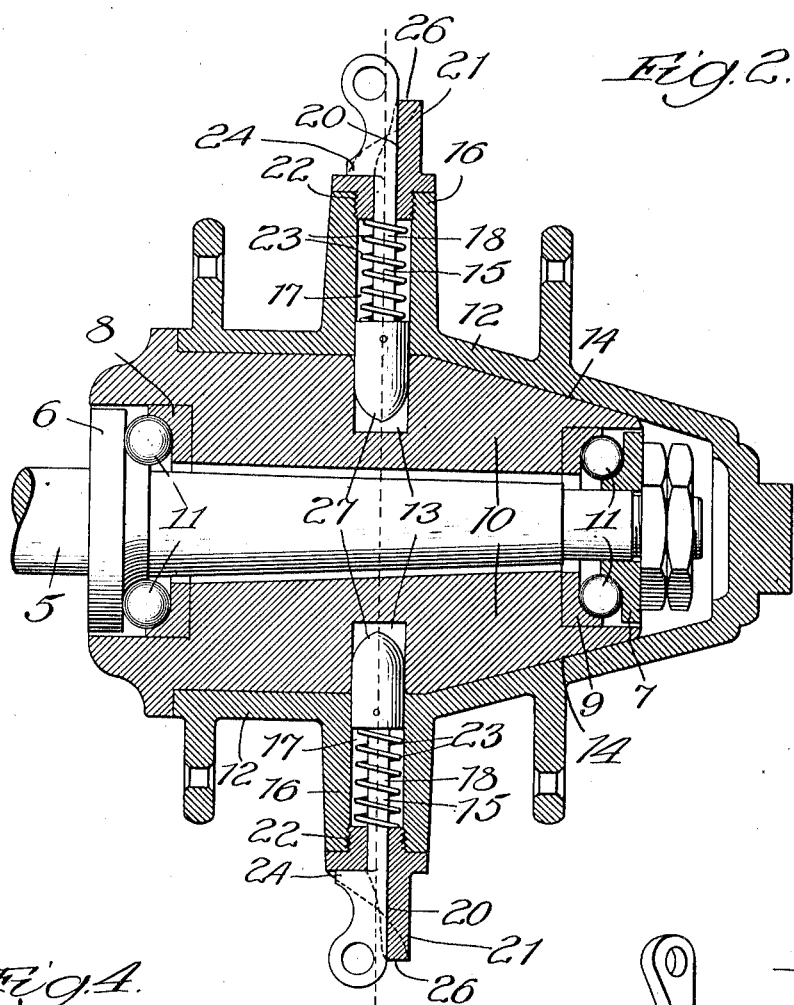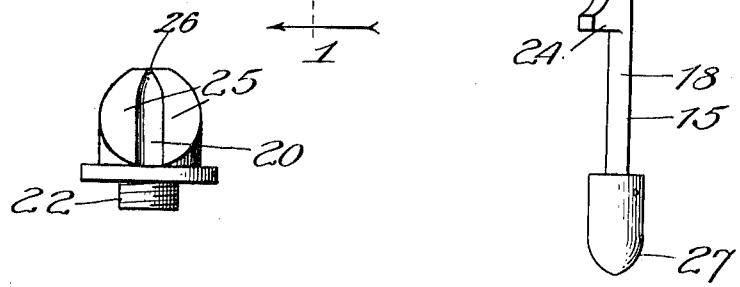

UNITED STATES PATENT OFFICE.

JOHN KELLY, OF CHICAGO, ILLINOIS.

DEMOUNTABLE WHEEL.

1,118,495.　　　　Specification of Letters Patent.　　Patented Nov. 24, 1914.

Application filed January 2, 1914. Serial No. 809,906.

*To all whom it may concern:*

Be it known that I, JOHN KELLY, a citizen of the United States, residing at Chicago, in the county of Cook and State of Illinois, have invented a new and useful Improvement in Demountable Wheels, of which the following is a specification.

My object is to provide novel and simple means for releasably securing a vehicle wheel in position on a member adapted to rotate with the wheel, which will operate to securely hold the wheel to said rotary member, and which will permit the wheel to be readily removed and replaced, or another substituted therefor.

Referring to the accompanying drawings—Figure 1 is a view in sectional elevation of the central portion of a wheel, and the support therefor, constructed in accordance with my invention, the section being taken at the line 1 on Fig. 2, and viewed in the direction of the arrow. Fig. 2 is a section taken at the line 2 on Fig. 1, and viewed in the direction of the arrow. Fig. 3 is a view in elevation of one of the similar plungers employed for holding the wheel to the rotatable member on which it is directly supported; and Fig. 4, a view in elevation of one of the similar cam devices employed for coöperation with the plungers.

I have chosen to illustrate my invention as applied to a wheel structure journaled on an axle, which is the condition presented in the case of the front wheel of an automobile, though it will be readily apparent from the following that certain features of my invention are not limited to use in this particular connection.

One of the front steering wheel axles of an automobile is represented at 5, this axle carrying ball-races 6 and 7 between which and ball-races 8 and 9, carried by an inner hub 10, balls 11 are interposed, thus providing ball-bearings between the inner hub 10 and the non-rotary axle 5. The outer hub of the wheel is represented at 12, this hub being connected with the felly, not shown, through the medium of spokes 13, the felly, spokes and outer hub-section 12 being adapted to be bodily removed from and replaced on the inner hub-section 10 as a unitary structure.

The inner hub-section 10, in the preferred embodiment of my invention, contains, in its periphery, diametrically opposed radially extending sockets 13, and is tapered toward its outer end, as indicated at 14. The sockets 13 are provided for the reception of interlocking members carried by the outer hub-section 12 to cause the inner and outer hub-sections described to rotate as a unitary structure.

The interlocking members, in the preferred construction illustrated, are in the form of plungers 15 which slide in bosses 16 containing openings 17 which open through the inner surface of the hub-section 12, the openings 17 being so disposed that they will register with the sockets 13 when the outer hub-section 12 is positioned on the inner hub-section 10, as represented in Figs. 1 and 2. The plungers 15 have stem portions 18 of reduced diameter which slide through openings 20 in plugs 21 screwed into the outer ends of the openings 17 in the bosses 16, coiled springs 22 being confined between the heads of the plungers 15 and the inner ends of the plugs 21, and yieldingly forcing the heads of the plungers toward the center of the hub-section 12. The outer ends of the stems 18 are shouldered, as represented at 24, at which shoulders the plungers bear against the ends of the plugs 21, the latter being provided with cam-surfaces 25 upon which the shoulders 24 ride when the plungers are axially rotated, for moving the latter radially in the openings 17.

The parts of the structure are so proportioned that the plungers 15, under the action of the springs 23, will be projected into the sockets 13 of the inner hub-section 10 when the parts are in the position illustrated in Figs. 1 and 2, the plungers operating to secure the outer hub-section 12 to the inner hub-section 10, so that these two parts will rotate as a unitary structure.

Assuming the parts to be in the positions illustrated in Figs. 1 and 2, the operator may release the outer hub-section 12 from the inner hub-section 10 by axially turning the plungers 15 which causes the shoulders 24 to ride upon the cam-surfaces 25, thus withdrawing the heads of the plungers 15 from the sockets 13, the shoulders 24 seating upon the outer flat surfaces 26 of the plugs 21 which holds the plungers in retracted position. All of the plungers having been removed from the sockets 13, the outer hub-section 12 and the parts carried thereby are then removed from the inner hub-section 10 by sliding the hub-section 12 longitudinally of the hub-section 10. In assembling the same outer hub-section, or one to be substituted therefor, with the inner hub-section 10, the outer hub-section may be first slipped over the inner hub-section to telescope one with the other, and the plungers then axially turned to permit them to occupy the position illustrated in Fig. 2 to cause the heads of the plungers to be projected into the sockets 13; or the plungers may be first axially turned, as stated, and the outer hub-section 12 then telescoped with the inner hub-section 10, the tapered surface 14 of the inner hub-section in the telescoping operation, by engaging with the tapered ends 27 of the plungers, causing them to be moved radially outward, but as soon as the plungers register with the sockets 13, the latter will be projected into them by the action of the springs 23.

While I have illustrated and described my invention as applied to a construction wherein the inner hub-section is rotatably mounted on a non-rotary axle, it will be readily understood that my invention may be applied with advantage to structures, wherein the part to which the outer hub-section is connected, is rigid on a shaft, or a part of the latter, and has a rotary movement. Furthermore, I do not wish to be understood as intending to limit my invention to any other particulars of the construction shown, as the same may be variously modified and altered without departing from the spirit of my invention, it being my intention to claim my invention as broadly and completely as the prior state of the art will permit.

What I claim as new and desire to secure by Letters Patent is—

The combination with a rotatably supported member containing a socket in its periphery, of a demountable wheel supported on said member, a plunger on the hub of said wheel movable into and out of said socket for releasably locking together said wheel and member and provided with a stem, a spring tending to project said plunger into said socket, a bearing member beyond said plunger provided with an inclined face terminating in a stop surface, and a projection on said stem adapted to ride against said inclined surface and seat upon said stop surface upon rotating said stem.

JOHN KELLY.

In presence of—
L. HEISLAR,
A. J. FLOYD.